United States Patent Office 3,454,363
Patented July 8, 1969

3,454,363
METAL CONTAMINANT REMOVAL FROM SOLID CARBONACEOUS MATERIALS
Robert W. Rieve, Drexel Hill, Pa., assignor to Atlantic Richfield Company, Philadelphia, Pa., a corporation of Pennsylvania
No Drawing. Filed Jan. 24, 1967, Ser. No. 611,270
Int. Cl. C01b 31/02
U.S. Cl. 23—209.9        12 Claims

ABSTRACT OF THE DISCLOSURE

The removal of metal contaminants from solid carbonaceous materials is effected with cation exchange resin.

---

The present invention relates to the removal of metal contaminants from carbonaceous materials and, more particularly, to a process for the removal of metal contaminants from solid carbonaceous materials with cation exchange resins.

Carbonaceous materials may be of either animal, vegetable or mineral origin. For example, carbonaceous materials may be derived from the blood, flesh and bones of animals; from materials of vegetable origin, such as hardwood and soft woods, corncobs, kelp, coffee beans, rice hulls, fruit pits, nutshells, etc., and from peat, lignite, soft and hard coals, tars and pitches, asphalt, petroleum residues, etc. Carbon, activated carbon, coke, etc., obtained from such sources have found wide application in such diverse applications as decolorizing and purification operations; pigments and reinforcing agents; and in the manufacture of such materials as electrodes, catalysts and tires.

However, most carbonaceous materials contain cations, especially alkali and alkaline earth metal cations. The presence of such cations is extremely detrimental in some of the potential applications for these materials. It is known, for example, that metallic impurities present in catalyst support or carrier materials are deleterious to a cracking process since they promote conversion of the hydrocarbon's charge to coke and normally gaseous products instead of desired normally liquid products. The coke used for electrodes in the manufacture of alumina is another instance where the carbonaceous material must be of very high purity. Standard methods for purifying carbonaceous materials by treatment with gaseous chlorine, hydrogen chloride or extraction with acid or alkaline solutions have not been satisfactory. Unwanted cations, e.g., iron, nickel, vanadium, lithium, sodium, potassium, rubidium, cesium, etc., are difficult and sometimes impossible to remove by gaseous treatment or simple liquid washing.

It has now been discovered that metal contaminants can be effectively removed from solid carbonaceous materials using ion exchange materials. Use of cation exchange materials improves the solid carbonaceous materials by reducing the metal content, especially alkali and alkaline earth metal cations, to very low values.

In accordance with the present invention, the removal of metal contaminants from solid carbonaceous materials is effected by contacting a solid carbonaceous material with a cation exchange resin at a pH of 5 or less and a temperature between room temperature and about 260° F. for 1 to 24 hours in an aqueous or non-aqueous medium.

It is desirable that the cation exchange resin be of a different size from the solid carbonaceous material in order that after the contacting period the cation exchange resin may be separated from the solid carbonaceous material by known methods such as by screening or by elutriation. Although it is convenient to have both the solid carbonaceous material and the cationic exchange material in finely divided particulate form, it is not essential that either of said materials be in such particulate form.

The solid carbonaceous material and cation exchange resin may be contacted either in a continuous manner or batchwise. However, intimate contact is not required between the carbonaceous material and the resin. When agitation is desirable, mechanical agitators may be employed or alternatively agitation with a gaseous medium such as steam or air may be employed. When the contacting is carried out at elevated temperatures, heating may be accomplished by the use of jacketed vessels which supply heat to the mixture from an external source or alternatively, the heat may be supplied to the mixture by steam agitation.

In general, the temperature of contacting the solid carbonaceous material with the cation exchange resin may range from ambient temperature to the known temperature at which the cation exchange resin disintegrates. Many of these resins will withstand temperatures of 260° F. or higher. It is possible to operate at these higher temperatures by employing appropriate super-atmospheric pressures to keep the aqueous or non-aqueous medium in the liquid phase. Normally, however, it is not necessary to utilize temperatures which exceed the boiling point of the aqueous or nonaqueous medium employed. Thus, when an aqueous medium is used operating temperatures are generally maintained between room temperature and 212° F.

It is necessary to use much longer contact times when employing temperatures of about 75° F. than when employing moderately elevated temperatures such as 120° F. or higher. Contact times of about 24 hours are required to remove metal contaminants from solid carbonaceous materials to an extent comparable with contact times of from only 2 to 3 hours at the higher temperatures. In general, contact times of at least 1 hour and preferably 2 hours are required for temperatures of 120° F. to the disintegration temperature of the resin. Thus, the preferred contact temperatures range from about 120° F. to about 212° F. and the preferred contact times from 2 to 8 hours. Longer times at the higher temperatures are not harmful, but do not result in any appreciable improvement in the removal of metal contaminants.

Another important contacting condition of this process is the pH of the aqueous or non-aqueous medium during contacting of the solid carbonaceous material with the cation exchange resin. If the pH is too high the amount of metal contaminants removed is so low that little or no improvement will be obtained by the process. Consequently, it has been found necessary to maintain the pH below 5 and preferably below about 4.5. Excellent results are obtained at a pH operating range of 2.7 to 4.5, which is the normal and preferred pH operating range. However, a pH as low as 2.0 may be employed advantageously. A variety of acids including, citric, hydrochloric, oxalic, sulfuric and tartaric, may be employed to maintain the desired pH.

The quantity of cation exchange resin required for contacting the solid carbonaceous material exceeds the amount calculated solely on the basis of the quantity of metal contaminants to be removed. In general, it has been found that the ratio of solid carbonaceous material to cation exchange resin should range between 0.25 to 1 gram of solid carbonaceous material per milliliter of wet cation exchange resin—which is approximately 0.5 to 2 grams of solid carbonaceous material per gram of dry cation exchange resin.

After the contacting step, the solid carbonaceous material may be separated from the resin by any suitable and convenient method, such as by screening or by elutriation. The latter method is preferred when it is desirable to minimize attrition.

Cation exchange resins suitable for the method of this invention are the commercially available strong acid type cation exchange resins. Examples of such resins are natural and artificial zeolites; phenolsulfonic acid condensate products with formaldehyde and phenol; sulfonated polystyrenes; and Amberlist 15, Amberlite IR–120 or Permutit-Q, which are produced by the sulfonation of a styrene and divinylbenzene copolymer. Amberlite IR–120 and Permutit-Q are well-known to the art of ion exchange and their preparation is described in detail in both the patented art and in the technical literature. In particular, the detailed method of their preparation is set forth in a book by Robert Kunin, entitled "Ion Exchange Resins," 2nd edition, John Wiley & Sons, Inc., New York, N.Y. (1958), starting at page 84.

The cation exchange resins as manufactured and shipped are generally wet. These resins are used in either an aqueous or non-aqueous medium. Suitable non-aqueous media include such petroleum distillate fractions as toluene, xylene, naphtha, etc. Use of a non-aqueous medium is particularly desirable with respect to materials such as petroleum coke which may be oily and difficult to contact in an aqueous medium. This difficulty may be overcome by using polar organic solvents such as ethyl alcohol, isopropyl alcohol, etc., or alcohol-water mixtures. The required amount of aqueous or non-aqueous medium need only be an amount necessary to obtain a slurry which can be effectively agitated.

When at least a portion of the ion exchange capacity of the cation exchange resin has become saturated by the cations removed from the carbonaceous material, the resin is regenerated by acid treatment in accordance with conventional methods recommended by the manufacturers. It is preferable to regenerate the resin after each contact with carbonaceous material even though its exchange capacity may be only partially saturated in order to insure that in the next cycle sufficient capacity is present. Nevertheless, if the quantities of contaminants present in the carbonaceous material are low, it may be unnecessary to regenerate all of the resin after each contact with the carbonaceous material.

The invention will be illustrated by the following specific examples, it being understood that there is no intention to be necessarily limited by any details thereof since variations may be made within the scope of the invention.

EXAMPLE I

Two carbon samples of coconut hulls were treated with Permutit-Q resin in the acid cycle in an aqueous slurry. The pH of the mixture was maintained between 2 and 3 by the addition of sulfuric acid and the temperature was held at 212° F. This treatment was continued for varying lengths of time and the ash content (i.e., the powder left upon heating consisting mainly of metals or metal salts) of the samples was recorded after each treatment to determine the amount of mineral matter removed.

| | Ash content (percent) | |
|---|---|---|
| | Sample 1 | Sample 2 |
| No treat | 3.5 | 1.9 |
| 6 hours | 3.2 | |
| 18 hours | 2.5 | 0.3 |
| 24 hours | 2.39 | |

When other solid carbonaceous materials and cation exchange resins, as defined above, are similarly reacted, substantially equivalent results are obtained.

However, when a comparable experiment is carried out without the ion exchange resin it is found that acidulated water alone within the same pH range will not appreciably remove metal contaminants from the solid carbonaceous material. Therefore, the presence of ion exchange resin is necessary in order to obtain the desired purity of the treated material.

The following example employs petroleum coke as the solid carbonaceous material to be treated. Petroleum coke is a byproduct of the refining industry obtained by severe thermal cracking and impurities in the crude oil tend to be concentrated in the resulting coke. Metal contaminants, in particular, must be removed or substantially reduced before the coke can be used in applications such as graphite manufacture requiring high purity coke. However, carbonaceous materials, such as petroleum coke, are difficult to purify because of the low porosity of these materials.

EXAMPLE II

The following table sets forth typical characteristics of petroleum coke:

| Property: | Raw coke |
|---|---|
| Moisture, percent | 0.5–2 |
| Volatile matter, percent | 6–15 |
| Fixed carbon, percent | 87–97 |
| Real density, g./cm.$^3$ | 1.2–1.8 |
| Ash, percent | 0.1–1.0 |
| Sulfur, percent | 0.2–2.5 |
| Hydrogen, percent | 3–4.5 |
| Nitrogen, percent | 0.1–0.5 |
| Iron, p.p.m. | 50–2000 |
| Vanadium, p.p.m. | 5–500 |
| Boron, p.p.m. | 0.1–0.5 |
| Titanium, p.p.m. | 2–60 |
| Silicon, p.p.m. | 50–300 |
| Aluminum, p.p.m. | 15–100 |
| Manganese, p.p.m. | 2–100 |
| Nickel, p.p.m. | 10–100 |
| Calcium, p.p.m. | 25–500 |
| Magnesium, p.p.m. | 10–250 |

Petroleum coke as shown in the above table having a particle size of 100–150 mesh (U.S. standard sieve) is treated with Amberlite IR–120 of 10–50 mesh (U.S. standard sieve) in a xylene medium under the following operating conditions:

| | |
|---|---|
| Temperature, ° F. | 140 |
| Time, hrs. | 3 |
| Coke/wt. resin (grams/milliliter) | 0.5 |
| pH | 3.5 |

Following this treatment, the coke is separated from the resin by simple screening and then washed with xylene. The metal content of the resulting coke is found to be materially reduced.

Accordingly, when the purification method of this example is employed the chemical nature of residues charged to the coking unit and the conditions maintained during coking are not as important as they might otherwise be in determining the quality of the coke ultimately obtained—permitting increased flexibility in the type of coking operation used by petroleum refineries.

When other solid carbonaceous materials and cation exchange resins, as defined above, are similarly reacted, substantially equivalent results are obtained.

Thus, metal contaminants which are difficult or impossible to remove by conventional techniques are removed from solid carbonaceous materials in accordance with the present invention resulting in high purity carbon material of enhanced utility. It will be understood that complete removal of metal contaminants is neither essential nor practical. However, substantially complete removal of contaminants buried in the carbonaceous material may be obtained by grinding the carbonaceous material before treatment.

Obviously, many modifications and variations of the invention as hereinbefore set forth may be made without departing from the spirit and scope thereof.

What is claimed is:

1. The process of removing metal contaminants from solid carbonaceous material which comprises contacting the solid carbonaceous material with a strong acid cation exchange resin in a liquid medium selected from the group consisting of a liquid medium containing a polar organic solvent and a non-aqueous liquid medium at a pH below about 5 and at a temperature between ambient temperature and about 260° F. thereby at least partially removing metal contaminants from said carbonaceous material and thereafter separating the contacted solid carbonaceous material from the cation exchange resin.

2. The process as in claim 1 wherein the solid carbonaceous material and the cation exchange resin are contacted in the ratio of between 0.25 and 1 gram of solid carbonaceous material per milliliter of wet cation exchange resin.

3. The process as in claim 1 wherein the solid carbonaceous material and the cation exchange resin are contacted in an aqueous medium containing a polar organic solvent.

4. The process as in claim 1 wherein the solid carbonaceous material and the cation exchange resin are contacted in a non-aqueous medium.

5. The process as in claim 1 wherein the pH is maintained between about 2.7 and about 4.5.

6. The process as in claim 1 wherein the temperature is maintained between about 120 and about 212° F.

7. The process as in claim 1 wherein the solid carbonaceous material and the cation exchange resin are contacted for a period of between about 2 and about 8 hours.

8. The method of removing metal contaminants from solid carbonaceous material which comprises adding solid carbonaceous material to a slurry of a strong acid cation exchange resin in a liquid medium selected from the group consisting of a liquid medium containing a polar organic solvent and a non-aqueous liquid medium, agitating the slurry containing the added solid carbonaceous materail while maintaining the slurry at a temperature ranging from 75° F. to the temperature at which the cation exchange resin disintegrates for from 1 to 24 hours at a pH ranging from 2 to 5 and separating the contacted solid carbonaceous material and the cation exchange resin.

9. The method as in claim 8 wherein the slurry is an aqueous slurry containing a polar organic solvent.

10. The method as in claim 8 wherein the slurry is a non-aqueous slurry.

11. The process as in claim 1 wherein the solid carbonaceous material and the cation exchange resin are contacted in a medium containing a polar organic solvent.

12. The method as in claim 8 wherein the slurry contains a polar organic solvent.

References Cited

UNITED STATES PATENTS

| 2,431,481 | 11/1947 | Hurd et al. | 23—110 |
| 2,500,727 | 3/1950 | Whittaker | 23—110 |
| 2,624,698 | 1/1953 | Hickey | 23—209.9 |
| 3,073,675 | 1/1963 | Leum et al. | 23—141 |
| 3,214,346 | 10/1965 | Mason et al. | 23—209.9 |

FOREIGN PATENTS

| 886,653 | 1/1962 | Great Britain. |

OTHER REFERENCES

Kunin: "Ion Exchange Resins," Copyright 1958, John Wiley & Sons, Inc., pages 49 and 52.

EDWARD J. MEROS, *Primary Examiner.*

U.S. Cl. X.R.

201—17